(12) United States Patent
Geng et al.

(10) Patent No.: US 11,757,948 B2
(45) Date of Patent: Sep. 12, 2023

(54) COMMUNICATION METHOD AND APPARATUS, AND ELECTRONIC DEVICE

(71) Applicant: BEIJING BYTEDANCE NETWORK TECHNOLOGY CO., LTD., Beijing (CN)

(72) Inventors: Xinyun Geng, Beijing (CN); Xin Zhang, Beijing (CN); Jie Chen, Beijing (CN); Guan Huang, Beijing (CN); Tianhui Shi, Beijing (CN); Shaodong Ma, Beijing (CN); Yizhuo Chen, Beijing (CN); Jing Lyu, Beijing (CN); Zeguo Kang, Beijing (CN); Yuanlong Zhang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/081,535

(22) Filed: Dec. 14, 2022

(65) Prior Publication Data

US 2023/0164196 A1    May 25, 2023

Related U.S. Application Data

(63) Continuation of application No. PCT/CN2021/100106, filed on Jun. 15, 2021.

(30) Foreign Application Priority Data

Jun. 18, 2020 (CN) .......................... 202010562556.5

(51) Int. Cl.
*H04L 65/1069* (2022.01)
*H04L 65/1096* (2022.01)

(52) U.S. Cl.
CPC ...... *H04L 65/1069* (2013.01); *H04L 65/1096* (2013.01)

(58) Field of Classification Search
CPC .................. H04L 65/1069; H04L 65/1096
USPC .......................................................... 709/204
See application file for complete search history.

(56) References Cited

U.S. PATENT DOCUMENTS

2016/0150183 A1    5/2016 Nagamine et al.

FOREIGN PATENT DOCUMENTS

| CN | 1889609 A | 1/2007 |
|----|-----------|--------|
| CN | 101610324 A | 12/2009 |
| CN | 101697582 A | 4/2010 |
| CN | 101754143 A | 6/2010 |
| CN | 101808220 A * | 8/2010 |
| CN | 101808220 A | 8/2010 |
| CN | 103067585 A | 4/2013 |

(Continued)

OTHER PUBLICATIONS

International Patent Application No. PCT/CN2021/100106; Int'l Search Report; dated Sep. 13, 2021; 2 pages.

*Primary Examiner* — Glenford J Madamba
(74) *Attorney, Agent, or Firm* — BakerHostetler

(57) ABSTRACT

Disclosed in embodiments of the present disclosure are a communication method and apparatus, and an electronic device. A specific implementation of the method comprises: in response to a call initiation operation of a multimedia conference, determining a candidate object of the multimedia conference according to an object targeted by the call initiation operation; and displaying, on a multimedia conference interface of the multimedia conference, call state information for the candidate object.

22 Claims, 6 Drawing Sheets

(56) References Cited

FOREIGN PATENT DOCUMENTS

| | | | | | |
|---|---|---|---|---|---|
| CN | 304349321 | S | | 11/2017 | |
| CN | 107659906 | A | * | 2/2018 | .......... H04M 3/4288 |
| CN | 107659906 | A | | 2/2018 | |
| CN | 111740984 | A | | 10/2020 | |
| EP | 2285107 | A1 | * | 2/2011 | ......... H04L 65/4038 |
| EP | 2285107 | A1 | | 2/2011 | |

* cited by examiner

COMMUNICATION METHOD AND APPARATUS, AND ELECTRONIC DEVICE

CROSS REFERENCE OF RELATED APPLICATION

The present application is a continuation application of PCT international patent application No. PCT/CN2021/100106, filed on Jun. 15, 2021 which claims the priority to Chinese Patent Application No. 202010562556.5, titled "COMMUNICATION METHOD AND APPARATUS, AND ELECTRONIC DEVICE", filed on Jun. 18, 2020 with the State Intellectual Property Office of the PRC, both of which are incorporated herein by reference in their entireties.

FIELD

The present disclosure relates to the technical field of internet, and in particular to a communication method, a communication apparatus and an electronic device.

BACKGROUND

With development of the internet, users use functions of terminal devices increasingly frequently, so that work and life become more convenient. For example, one user may conduct an on-line multimedia conference with other users via a terminal device. Remote interaction between users can be realized through the on-line multimedia conference. In this way, the users are unnecessary to conduct a conference together at a fixed place. The multimedia conference avoids limitation to the place in the conventional face-to-face conference to a great extent.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

A communication method, a communication apparatus and an electronic device are provided according to embodiments of the present disclosure.

In a first aspect, a communication method is provided according to embodiments of the present disclosure. The method includes: determining, in response to a call initiation operation of a multimedia conference, a candidate object of the multimedia conference according to an object to which the call initiation operation is performed; and displaying call status information of the candidate object in a multimedia conference interface of the multimedia conference.

In a second aspect, a communication method is provided according to embodiments of the present disclosure. The method includes: displaying, in response to a determination that a target call request is received and an ongoing call process exists, call prompt information corresponding to the target call request.

In a third aspect, a communication apparatus is provided according to embodiments of the present disclosure. The apparatus includes: a determining unit, configured to determine, in response to a call initiation operation of a multimedia conference, a candidate object of the multimedia conference according to an object to which the call initiation operation is performed; and a display unit, configured to display call status information of the candidate object in a multimedia conference interference of the multimedia conference.

In a fourth aspect, a communication apparatus is provided according to embodiments of the present disclosure. The communication apparatus includes a displaying module, configured to display, in response to a determination that a target call request is received and an ongoing call process exists, call prompt information corresponding to the target cell request.

In a fifth aspect, an electronic device is provided according to some embodiments of the present application. The electronic device includes: one or more processors; and a memory configured to store one or more programs. The one or more programs, when being executed by one or more processors, cause the one or more processors to implement the communication method according to the first aspect or the second aspect.

In a sixth aspect, a computer readable medium storing computer programs is provided according to embodiments of the present disclosure. The computer programs are executed by a processor to implement the communication method according to the first aspect or the second aspect.

According to the communication method, communication apparatus and electronic device provided in the embodiments of the present disclosure, the call status information of the candidate object is displayed, to prompt the conference participant of information that the candidate object is being called. In this case, the conference participant does not call the candidate object, thereby reducing a probability that multiple conference participants in the multimedia conference status each call the candidate object. Therefore, in one aspect, the number of times of call initiation is reduced, thus communication resources are saved; and in the other aspect, interference on the candidate object can be reduced.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
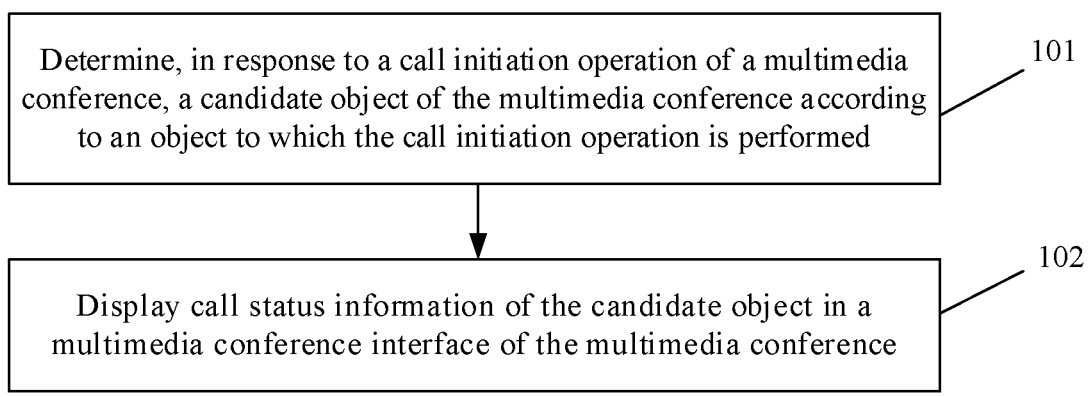
FIG. 1 is a flowchart of a communication method according to an embodiment of the present disclosure.

Reference is made to FIG. 1 which shows a flowchart of a communication method according to an embodiment of the present disclosure. The communication method is applied to a terminal device. As shown in FIG. 1, the method includes steps 101 and 102.

In step 101, in response to a call initiation operation of a multimedia conference, a candidate object of the multimedia conference is determined according to an object to which the call initiation operation is performed.

In the embodiment, a first performing body (such as a terminal device) of the communication method may determine, in response to a call initiation operation of the multimedia conference, a candidate object of the multimedia conference according to an object to which the call initiation operation is performed.

In the embodiment, the multimedia conference may be an online conference conducted in a multimedia manner. The multimedia conference includes at least one of: an audio conference and an audio and video conference. The audio and video conference includes both interaction of audio and interaction of video. In some embodiments of the present disclosure, the multimedia conference may be an audio-and-video conference.

The above server may be configured to support the multimedia conference.

In the embodiments, an application of the multimedia conference may be an application of a conference service of the multimedia conference provided by a serving end. The application has multiple types, and the types are not limited herein. For example, the application may be an instant video conference application, a communication application, a video playing application, an email application, a hosting program (for example Applet) of the application, or a browser application having a multimedia conference function provided by a webpage.

It should be noted that, the application in the present disclosure not only adapts to a mobile terminal, but also may be an application program installed in a terminal device (an electronic device such as PC).

In the embodiment, the call initiation operation of the multimedia conference may be a call operation initiated in the multimedia conference indicated by a multimedia conference status.

In some application scenarios, the call initiation operation of the multimedia conference may be initiated by a conference participant of the multimedia conference or may be automatically triggered by a server. In an example, it is appointed that a multimedia conference starts at ten o'clock; no conference participant joins a conference in one minute since a host initiates the conference, the server may send a call request to the conference participant.

In the embodiment, the multimedia conference status may be a conference ongoing status.

In some application scenario, the conference participant in the multimedia conference status may be a conference participant who already joins the multimedia conference. The conference participant in the multimedia conference status may directly send a joining invitation request to the server by triggering a call initiation operation, and thus the server forwards the joining invitation request to the candidate object.

In the embodiment, the conference participant in the multimedia conference status may send a joining invitation request to users not joining the multimedia conference. The user receiving the joining invitation request may join the multimedia conference, that is, becoming a conference participant in the multimedia conference status, if the user confirms the joining invitation request; and the user does not join the multimedia conference if the user rejects the joining invitation request.

In the embodiment, if the first performing body is an electronic device performing a call initiation operation, an object to which the call initiation operation is performed may be determined as the candidate object of the multimedia conference. If the first performing body is not an electronic device performing a call initiation operation, the first performing body may determine the candidate object of the multimedia conference according to an object identifier (indicating an object to which the call initiation operation is performed) received from the server.

In step 102, call status information of the candidate object is displayed in a multimedia conference interface of the multimedia conference.

In the embodiment, the first performing body may display the call status information of the candidate object according to the candidate object of the multimedia conference, in the multimedia conference interface of the multimedia conference.

In the embodiment, the multimedia conference interface may be understood as various interfaces of the multimedia conference.

The call status information of the candidate object may be used to indicate that the candidate object is being called to join the conference.

Specific forms of the call status information may be configured according to an actual application scenario, and are not limited herein.

It should be noted that, according to the communication method provided in the embodiment, the call status information of the candidate object is displayed, to prompt the conference participant of information that the candidate object is being called. In this case, the conference participant does not call the candidate object, thereby reducing a probability that multiple conference participants in the multimedia conference status each call the candidate object. Therefore, in one aspect, the number of times of call initiation is reduced, thus communication resources are saved; and in the other aspect, interference on the candidate object can be reduced.

It should be noted that, the first performing body may be the electronic device performing the call initiation operation or not the electronic device performing the call initiation operation.

In an example, the conference participant in the multimedia conference status may include a conference participant A and a conference participant B. The conference participant A triggers a call initiation operation, an electronic device of the conference participant A (login) may perform the method according to the embodiment, and an electronic device of the conference participant B may also perform the method according to the embodiment. If the electronic device of the conference participant B is the first performing body, the electronic device performing the call initiation operation is inconsistent with the first performing body in the embodiment.

In some embodiments, the method further includes: sending a call initiation notification to the server in response to detecting the call initiation operation. The call initiation notification includes a candidate object identifier. The server generates an update notification of the candidate object in response to receiving the candidate object identifier.

If the first performing body is an electronic device used by the conference participant A, the first performing body may determine an object to which a local call initiation operation is performed as the candidate object of the multimedia conference. Then, the first performing body sends a candidate object identifier to the server. The server sends an update notification of the candidate object including the candidate object identifier to the conference participant B in the multimedia conference status.

In some embodiments, step 101 includes: determining the candidate object of the multimedia conference according to the candidate object identifier in the update notification of the candidate object, in response to receiving the update notification of the candidate object from the server.

If the first performing body is an electronic device used by the conference participant B, the first performing body may determine an object indicated by the candidate object identifier in the notification information as the candidate object of the multimedia conference according to the candidate object update notification sent by the server.

In some embodiments, step 102 may include: displaying call status information in a conference participant list in the multimedia conference interface.

The conference participant list may be used to display related information of the conference participant. In general, the conference participant list is used to display related information of the conference participant in the multimedia conference status.

Call status information of the candidate object is displayed in the conference participant list. In other words, related information of the candidate object (for example the candidate object identifier) may be pre-displayed in the conference participant list, and the call status information is used to indicate the conference participant as the candidate conference participant, that is, being called and not joining the multimedia conference.

Figure 2:
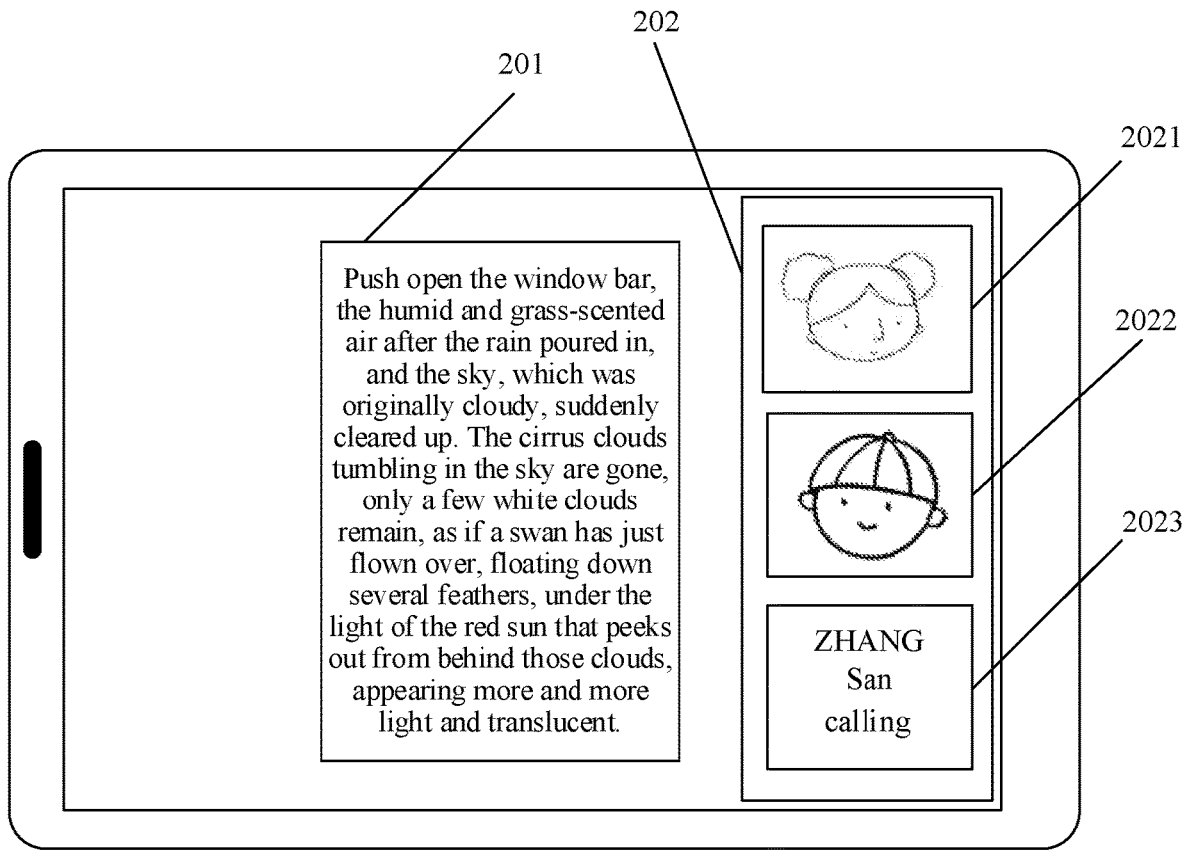
FIG. 2 is a schematic diagram of a scenario of a communication method according to an embodiment of the present disclosure.

Reference is made to FIG. 2 which shows a schematic application scenario. FIG. 2 shows a multimedia conference interface. In FIG. 2, a shared document is displayed in a shared document displaying region 201. A conference participant list 202 displays a conference participant identifier A 2021, a conference participant identifier B 2022 and call status information 2023 of the candidate object. In an example, the conference participant identifier may be a head portrait or a video image of the conference participant, and the call status information may include the candidate object identifier and prompt information indicated by "calling".

It should be noted that, the call status information of the candidate object is displayed in the conference participant list, thereby improving a probability that the conference participant acquires the call status information, that is, effectively avoiding a case that the conference participants (related or different) calls a same candidate object.

A user may intuitively know an object currently in the multimedia conference status from the conference participant list. In the prior art, related information of the candidate object is not displayed in the conference participant list. If the user finds that an expected object does not join the multimedia conference according to the conference participant list, the user calls the expected object, thus repeated calls may occur. While according to the present disclosure, the call prompt information of the candidate object is displayed in the conference participant list, a probability that the user calls the candidate object is effectively reduced when the user views the conference participant list.

In some embodiments, the method may further include: stopping displaying of the call status information for a candidate object of which response information satisfies a preset condition in the conference participant list, in response to a determination that response information of the candidate object to a call request satisfies the preset condition.

The response information of the candidate object to the call request may include any one of: accepting the call, rejecting the call or performing no response in a preset time period.

The preset condition may include a time instant of instructing to stop displaying of the call status.

In an example, the preset condition may include but not limited to at least one of: the candidate object accepting the call, the candidate object rejecting the call, and the candidate object performing no response (neither accepting nor rejecting) in the preset time period.

In some embodiments, the method further includes: stopping displaying of the call status information for a candidate object accepting the call in the conference participant list, in response to a determination that the candidate object accepts the call.

The candidate object may accept the call, and may send a call acceptance notification to the server. The server may determine the candidate object as a conference participant to join the multimedia conference, in response to receiving the call acceptance notification. When a new conference participant joints the multimedia conference, the server may send an update notification of the conference participant to the conference participant in the multimedia conference status.

The conference participant in the multimedia conference status may determine that the candidate object accepts the call in response to receiving the update notification of the conference participant; and stops displaying of the call status information for the candidate object accepting the call in the conference participant list.

Optionally, the candidate object accepting the call may be displayed in the conference participant list, as a formal conference participant.

In some embodiments, the method further includes: stopping displaying of the call status information for a candidate object rejecting the call in the conference participant list, in response to a determination that the candidate object rejects the call.

The candidate object may reject the call, and may send a call rejection notification to the server. The server may delete the candidate object from the candidate objects of the conference in response to receiving the call rejection notification. When the number of candidate objects is reduced in the multimedia conference, the server may send an update notification of the candidate object to the conference participant in the multimedia conference status.

The conference participant in the multimedia conference status determines that the candidate object rejects the call in response to receiving the update notification of the candidate object; and stops displaying of the call status information for the candidate object rejecting the call in the conference object list.

In some embodiments, the method further includes: stopping displaying of the call status information for the candidate object performing no response in a preset time period in the conference participant list, in response to a determination that the candidate object performs no response in the preset time period.

The preset time period may be set according to an actual application scenario, and is not limited herein.

The candidate object may perform no response in a long time period (neither accept nor reject), that is, performing no response to the call request in the preset time period.

Optionally, the server may determine that the candidate object performs no response in the preset time period if the server receives no call acceptance notification or call rejection notification in the preset time period.

Optionally, in a case that the candidate object performs no response to the call request in the time period preset by the user, the candidate object may actively sends a request unprocessed notification. The server may determine that the candidate object performs no response in the preset time period in response to receiving the request unprocessed notification.

The server may send an unresponsive notification to the conference participant in the multimedia conference status when determining that the candidate object performs no response in the preset time period.

The conference participant in the multimedia conference status may determine that the candidate object performs no response in the preset time period in response to receiving the unresponsive notification; and then stops displaying of the call status information for the candidate object performing no response in the preset time period in the conference participant list.

In some embodiments, step 102 may include: determining, in response to detecting a contact search operation, whether an object indicated by the contact search operation is a candidate object according to the candidate object of the multimedia conference; and displaying the call status information in response to a determination that the object indicated by the contact search operation is the candidate object.

The contact search operation is performed to search for a contact.

The contact search operation is performed on a contact set in which association is established, to search for the contact.

In some application scenario, the conference interface may include a contact search window in which the user may input a contact identifier.

Optionally, the user triggers search control when inputting a complete contact identifier, an action for triggering the search control may serve as the contact search operation. After the user inputs the contact identifier and triggers the search control, the call status information is displayed.

Optionally, inputting (all or a part) the contact identifier by the user may serve as the contact search operation.

The first performing body may match the contact identifier inputted by the user with the contact set, and displays a matching result. If the contact identifier in the matching result is among the candidate object identifier of the multimedia conference, it is determined that the object indicated by the search operation is the candidate object. In this case, the call status information is displayed for the contact identifier in the matching result.

Figure 3:
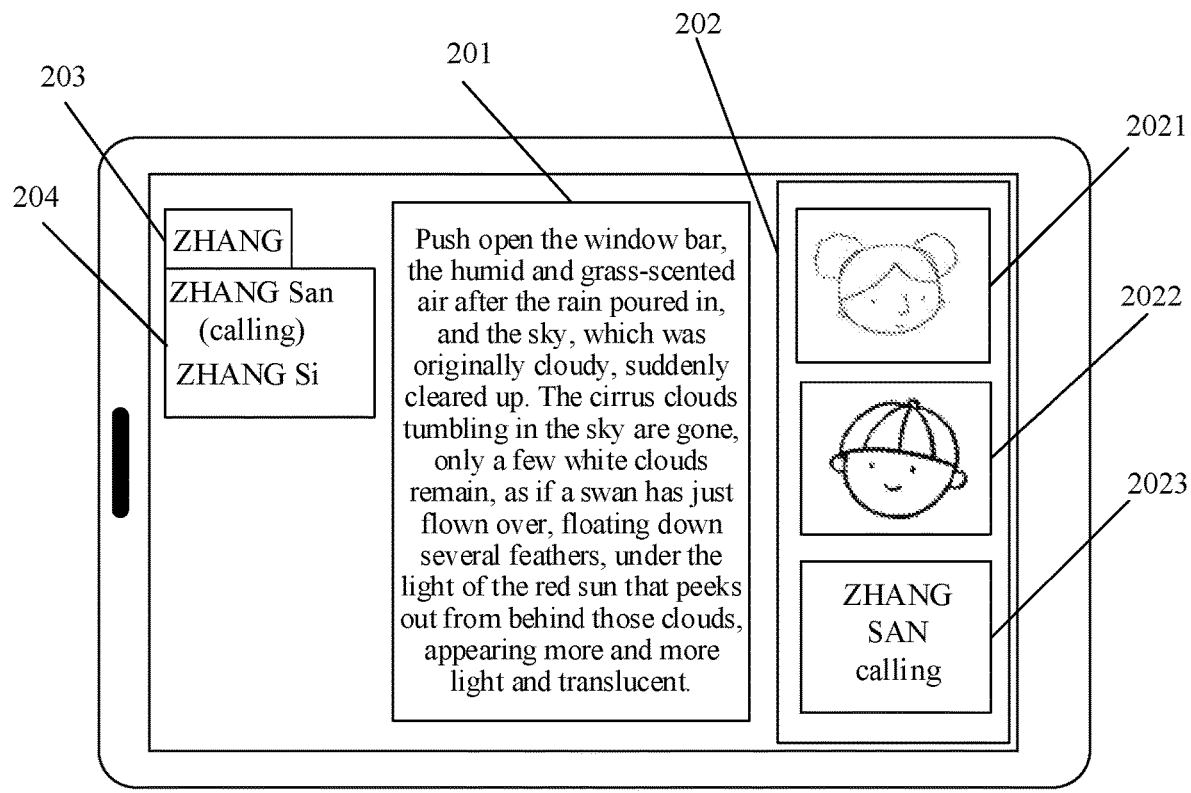
FIG. 3 is another schematic diagram of the scenario of the communication method according to an embodiment of the present disclosure.

Reference is made to FIG. 3 which shows a schematic application scenario according to an embodiment of the present disclosure. In FIG. 3, the multimedia conference interface may display a contact search window 203 and a search result displaying region 204. If a user inputs "ZHANG", the first performing body may obtain two matching results "ZHANG San" and "ZHANG Si". In which, "ZHANG San" is the candidate object of the multimedia conference, and "ZHANG Si" is not a candidate object of the multimedia conference. Therefore, call status information "calling" is displayed for "ZHANG San", and is not displayed for "ZHANG San".

In some embodiments, the method may further include: initiating a call to an object indicated by a contact search operation, in response to a determination that the object indicated by the contact search operation is not the candidate object of the multimedia conference and a call initiation operation for the object indicated by the contact search operation is detected.

If the contact identifier in the matching result is not among the candidate object identifier of the multimedia conference, it is determined that the object indicated by the contact search operation is not the candidate object of the multimedia conference. In this case, the call status information is not displayed for the user who is not the candidate object. The user may call an object for which the call status information is not displayed in an association manner.

Referring to FIG. 3, the user clicks "ZHANG Si", a call to "ZHANG Si" may be initiated. When the user clicks "ZHANG San", confirmation information in a pop-up window form is displayed to the user. That is, the user is prompted again of information that ZHANG San is being called, and the user is asked regarding whether to call again.

In some embodiments, the candidate object displays call prompt information of the call request in response to a determination that the response status indicates that the call request is received.

It should be noted that, call prompt information may be displayed when the candidate object is calling. In this way, the user is promoted of a call request, and the user selects whether to respond to the call request, thereby reducing a possibility that the user misses a call.

The call prompt information includes rejection control and/or response control.

In some embodiments, the candidate object displays, in response to receiving at least two call requests, call prompt information for each of the at least two call requests. The call prompt information includes rejection control and/or response control.

In some application scenario, the candidate object may have two unprocessed call requests. In this case, the candidate object may display corresponding call prompt information for each of the two unprocessed call requests.

In some embodiments, the process of displaying, in response to receiving at least two call requests, the call prompt information for each of the at least two call requests includes: displaying call prompt information of the at least two call requests in a same interface.

The same interface displaying at least two pieces of call prompt information may be any type of interface. Optionally, a screen of the terminal displays only at least two pieces of call prompt information, or at least two pieces of call prompt information is displayed on the same interface.

The displaying on the same interface does not mean simultaneous displaying. That is, different call prompt information may be displayed at a certain time instant, but time instants when different prompt information are displayed for the first time are different.

In some application scenarios, if the candidate object is in a responsive status (that is, joining the multimedia conference or conducting a one-to-one call), call prompt information corresponding to the at least two call requests may be simultaneously displayed on an interface of the responsive status. In this case, the user is prompted of all unprocessed call requests simultaneously, and the user selects to accept which call according to the need. Optionally, the first performing body may automatically terminate the call not accepted by the user and the ongoing call.

It should be noted that, the call prompt information is displayed in the same interface, so that the user can select a required call process. If the user determines that a subsequent call process is more important than a current call process, the user may terminate the current call process and join a new call process.

In some embodiments, the process of displaying, in response to receiving at least two call requests, call prompt information for each of the at least two call requests by the candidate object includes: generating a call request queue according to time when the call request is received; and displaying, in response to detecting that a target call request in the call request queue is rejected, corresponding call prompt information for a call request after the target call request in the call request queue.

In some application scenarios, the call request queue may include an unprocessed call request. The call request in the call request queue may be deleted after being processed by the user. As time goes on, a received new call request may be added to the call request queue.

In some application scenarios, the target call request may be any call request in the call request queue.

It should be noted that, call prompt information corresponding to the call requests is displayed one by one as needed according to the call request queue, so that interference on selection of the user is reduced without missing the call request. That is, at least two pieces of call prompt information is displayed simultaneously to the user, resulting in interference on the selection of the user.

In some embodiments, the candidate object terminates, in response to detecting triggering on the response control, calls expect a call corresponding to the triggered response call.

The first performing body automatically terminates the call other than the call corresponding to the triggered response control, thereby simplifying the user operation.

Figure 4:
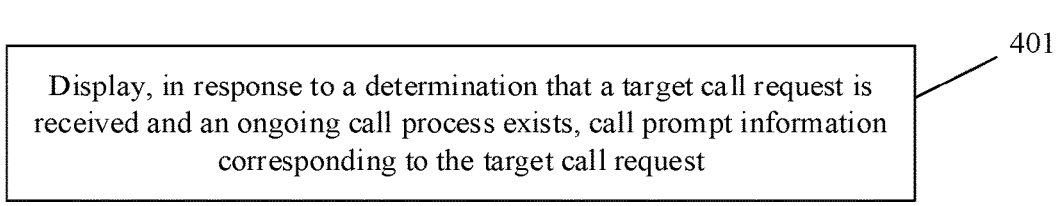
FIG. 4 is a flowchart of a communication method according to an embodiment of the present disclosure.

Reference is made to FIG. 4 which shows a flowchart of a communication method according to an embodiment of the present disclosure. The communication method is applied to a terminal device. As shown in FIG. 4, the method includes step 401.

In step 401, call prompt information corresponding to the target call request is displayed, in response to a determination that the target call request is received and an ongoing call process exists.

In the embodiment, a second performing body (for example a terminal device) of the communication method shown in the embodiment may display call prompt information corresponding to the target call request in response to a determination that the target call request is received and the ongoing call process exists.

The second performing body of step 401 may be an electronic device of the candidate object of the multimedia conference.

For convenience of illustration, a user logged in the second performing body may be referred to as a second user in the embodiment.

In the embodiment, the target call request is used only for convenience of description, and does not limit the call request.

In the embodiment, prompt information of the target call is used to prompt the target call request.

The call process may be used to record call related information and an object performing a call related action.

Types of the call are not limited herein. In an example, the call may be a call in the multimedia conference or a call conducted between contacts.

In some embodiments, the call process may include but not limited to at least one of: a multimedia conference process and a contact call process. Accordingly, the call request may include a multimedia conference invitation request and a contact call request.

In an example, the multimedia call process may send a multimedia conference invitation to a terminal to which the second user logs in, when it is expected to invite the second user to join the multimedia conference.

In an example, a contact established an association with the second user in advance, may send a contact call invitation to the terminal to which the second user logs in, when the contact expects to interact with the second user.

In some application scenario, the second performing body may establish a call process corresponding to the call request in response to receiving the call request. The second performing body may establish, in response to detecting a call initiated by the second user, a call process corresponding to the call initiated by the user.

In some embodiments, a status of the call process may be set according to an actual application scenario and is not limited herein. In an example, the status of the call process may include but not limited to at least one of: an ending status, a call request unprocessed status, a call initiation status and a call ongoing status.

Statuses of the call process other than the ending status may be referred to as a non-ending status. That is, the non-ending status may include but not limited to at least one of: a call request unprocessed status, a call initiation status and a call ongoing status.

It should be noted that, according to the communication method provided in the embodiment, after receiving the target call request, the second performing body displays target call prompt information for prompting the target call request, regardless of the second performing body being calling, being initiating a call or being displaying the call prompt information. In this way, the user is promoted of the target call request, and the user determines whether to respond to the target call request, thereby reducing a possibility that the user misses a call.

According to the method in the embodiment, the user may select the call process. If the user determines that a subsequent call process is more important than a current call process, the user may terminate the current call process and joins a new call process.

In the prior art, if the second performing body can accept only one call and the second performing body is calling currently, subsequent calls are omitted by default for the second performing body. For a call initiation party, a busy line status may be displayed or the call is rejected automatically.

The call prompt information includes rejection control and/or response control.

In some embodiments, the second performing body displays, in response to receiving at least two call requests, call prompt information for each of the at least two call requests.

In some application scenarios, the second performing body may have two unprocessed call requests. In this case, call prompt information corresponding to each of the two unprocessed call requests is displayed.

In some embodiments, the second performing body may display call prompt information of the at least two call requests on a same interface.

The at least two pieces of call prompt information is displayed on a same interface, and the interface may have any type. Optionally, a screen of the terminal displays at least two pieces of call prompt information, or the at least two pieces of call prompt information is displayed on a same interface.

The displaying on the same interface does not mean simultaneous displaying. That is, different call prompt information may be displayed at a certain time instant, but time instants when different prompt information are displayed for the first time are different.

In some application scenarios, if the second performing body is in a responsive status (that is, joining the multimedia conference or conducting a one-to-one call), call prompt information corresponding to the at least two call requests is displayed on the interface of the responsive status. In this way, the user is prompted of unprocessed call requests simultaneously, and the user selects to accept which call according to the need. Optionally, the first performing body may automatically terminate the call not accepted by the user or the ongoing call.

It should be noted that the call prompt information is displayed in the same interface, so that the user can select a required call process. If the user determines that a subsequent call process is more important than a current call process, the user may terminate the current call process and join a new call process.

In some embodiments, the second performing body may: generate a call request queue according to time when the call request is received; and display, in response to detecting that the target call request in the call request queue is rejected, call prompt information corresponding to a call request after the target call request in the call request queue.

In some application scenarios, the call request queue may include unprocessed call requests. The call request in the call request queue may be deleted after being processed by the user. As time goes on, a received new call request may be added to the call request queue.

In some application scenarios, the target call request may be any call request in the call request queue.

It should be noted that, call prompt information corresponding to the call requests is displayed one by one as needed according to the call request queue, so that interference on selection of the user is reduced without missing the call request. That is, at least two pieces of call prompt information is displayed simultaneously to the user, resulting in interference on the selection of the user.

Figure 5:
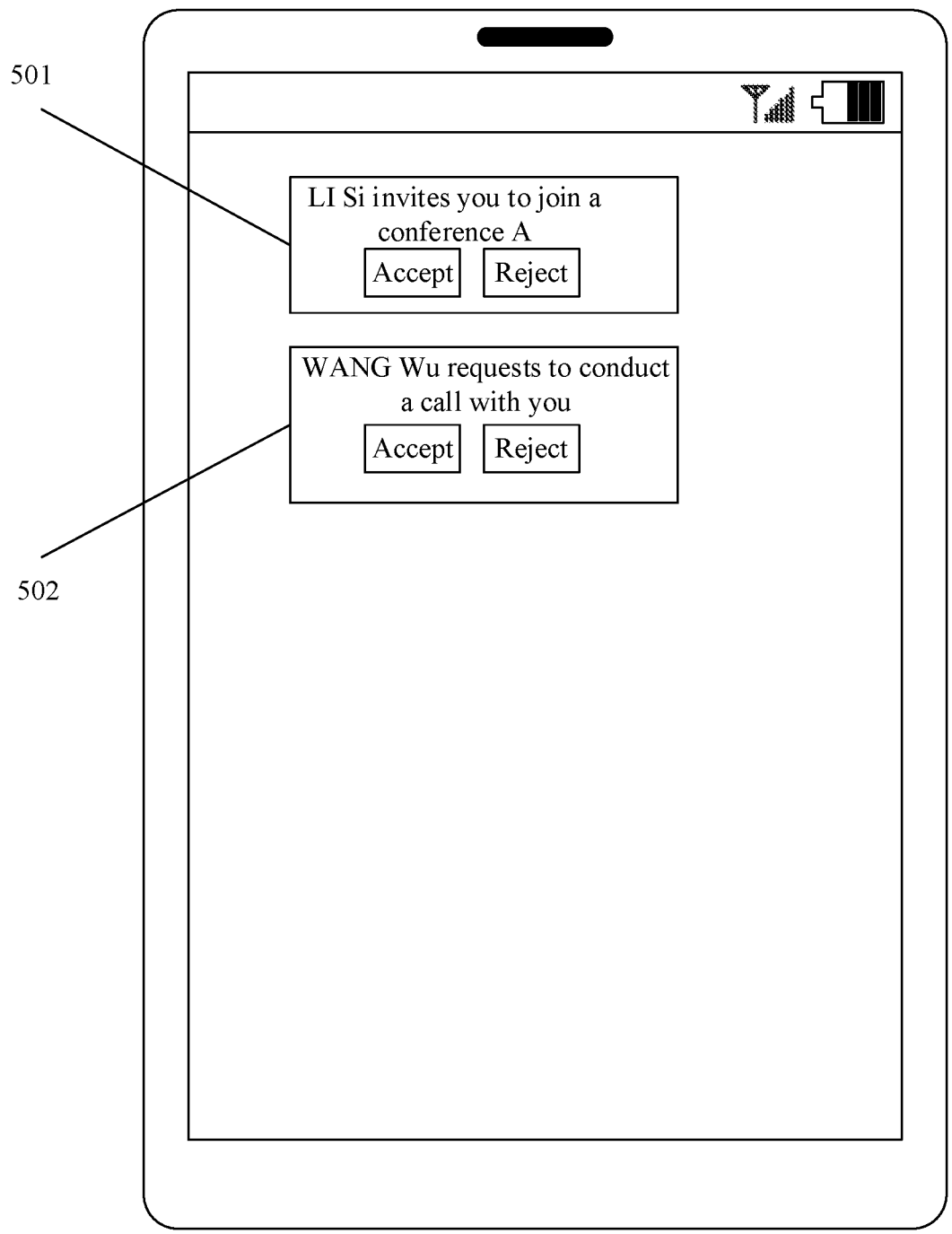
FIG. 5 is another schematic diagram of the scenario of the communication method according to an embodiment of the present disclosure.

Reference is made to FIG. 5 which shows an interface of a called end. In FIG. 5, a user logging in the called end may be ZHANG San. LI Si invites ZHANG San to join a conference A, and WANG Wu calls ZHANG San to request to conduct a dialogue. Optionally, ZHANG San may perform a video call with ZHAO Liu currently (not shown in FIG. 5). In an example, in response to the invitation request from LI Si, call prompt information 501 may be displayed. The call prompt information 501 may include a calling party identifier "LI Si", a call type (for example, a multimedia conference), and a conference identifier "conference A". In an example, in response to the request from WANG Wu, call prompt information 502 may be displayed. The call prompt information 502 may include: a calling party identifier "WANG Wu", and a call type (for example two-person call).

In some embodiments, step 401 may include: displaying the target call prompt information in a call interface of a call process, in response to detecting the call process in an ongoing status.

In some embodiments, step 401 may include: displaying the target call prompt information based on a request for displaying call prompt information corresponding to a request unprocessed status, in response to determining that a communication process in which the call request is not processed exists.

In some embodiments, the call prompt information may include but not limited to at least one of: a call initiation party identifier, response control and rejection control.

In some embodiments, the method may further include: initiating a call corresponding the triggered response control, in response to detecting a trigger operation for the response control.

Triggering the response control by the user may be understood as that the user expects to join the call corresponding to the response control. In this way, the user initiates the call corresponding to the triggered response control, thereby realizing functions expected by the user.

In some embodiments, the method may further include: terminating the call process in a non-ending status in response to detecting a triggering operation for the response control.

In some application scenarios, the terminating the call process in a non-ending status may include at least one of:

terminating a call in an ongoing status, rejecting an unprocessed call request and terminating a call being initiated.

In some application scenarios, the second performing body may be performing a call or may be displaying call prompt information corresponding to the unprocessed call request, when receiving the target call request. In this case, the second user logging in the second performing body accepts the target call request (that is, triggering the response control), indicating that the second user currently expects to join a call corresponding to the target call request, the second performing body terminates the call or request expect the target call request. In this way, the user operation is simplified, that is, the user is unnecessary to terminate the call or trigger the rejection control for the call or request except the target call request.

Figure 6:
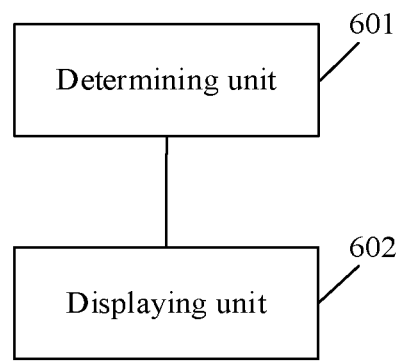
FIG. 6 is a schematic diagram of a communication apparatus according to an embodiment of the present disclosure.

Referring to FIG. 6, an apparatus is provided according to an embodiment of the present disclosure to implement the methods shows in the above drawings. The apparatus embodiment corresponds to the method embodiment shown in FIG. 1. The apparatus may be applied to various electronic devices.

As shown in FIG. 6, the communication apparatus according to the embodiment includes a determination unit 601 and a displaying unit 602. The determining unit 601 is configured to determine, in response to a call initiation operation of a multimedia conference, a candidate object of the multimedia conference according to an object to which the call initiation operation is performed. The displaying unit 602 is configured to display call status information of the candidate object in a multimedia conference interface of the multimedia conference.

In the embodiment, for processing of the determining unit 601 and the displaying unit 602 of the communication apparatus and resulting technical effects, one may refer to related illustration of step 101 and step 102 in the embodiment described with reference to FIG. 1. Details are not described herein.

In some embodiments, the process of displaying call status information of the candidate object in a multimedia conference interface of the multimedia conference includes: displaying the call status information in a conference participant list of the multimedia conference interface.

In some embodiments, the apparatus is further configured to: stop displaying of the call status information for a candidate object satisfying a preset condition in the conference participant list, in response to a determination that response information of the candidate object to a call request satisfies the preset condition.

In some embodiments, the apparatus is further configured to: stop displaying of the call status information for a candidate object accepting a call in the conference participant list, in response to a determination that the candidate object accepts the call.

In some embodiments, the apparatus is further configured to: stop displaying of the call status information for a candidate object rejecting a call in the conference participant list, in response to a determination that the candidate object rejects the call.

In some embodiments, the apparatus is further configured to: stop displaying of the call status information for a candidate object performing no response in a preset time period in the conference participant list, in response to a determination that the candidate object performs no response in the preset time period.

In some embodiments, the process of displaying call status information of the candidate object in a multimedia conference interface of the multimedia conference includes: determining, in response to a determination that a contact search operation is detected, whether an object indicated by the contact search operation is a candidate object of the multimedia conference; and displaying the call status information in response to a determination that the object indicated by the contact search operation is the candidate object of the multimedia conference.

In some embodiments, the apparatus is further configured to: initiate a call to the object indicated by the contact search operation, in response to a determination that the object indicated by the contact search operation is not the candidate object of the multimedia conference and a call initiation operation for the object indicated by the contact search operation is detected.

In some embodiments, the apparatus is further configured to: send a call initiation notification to a server in response to a determination that the call initiation operation is detected. The call initiation notification includes a candidate object identifier, and the server generates an update notification of the candidate object in response to receiving the candidate object identifier.

In some embodiments, the determining, in response to a call initiation operation of a multimedia conference, a candidate object of the multimedia conference according to an object to which the call initiation operation is performed includes: determining, in response to receiving an update notification of the candidate object from a server, the candidate object of the multimedia conference according to a candidate object identifier in the update notification of the candidate object.

In some embodiments, the candidate object displays, in response to a determination that a response status indicates a call request being received, call prompt information for the call request. The call prompt information includes rejection control and/or response control.

In some embodiments, the candidate object displays, in response to receiving at least two call requests, call prompt information for each of the at least two call requests. The call prompt information includes rejection control and/or response control.

In some embodiments, the process of displaying, in response to receiving at least two call requests, call prompt information for each of the at least two call requests by the candidate object includes: displaying call prompt information of the at least two call requests in a same interface.

In some embodiments, the process of displaying, in response to receiving at least two call requests, call prompt information for each of the at least two call requests by the candidate object includes: generating a call request queue according to time when the call request is received; and displaying, in response a detection that a target call request in the call request queue is rejected, call prompt information for a call request after the target call request in the call request queue.

In some embodiments, the candidate object terminates, in response to detecting triggering to the response control, calls except a call corresponding to the triggered response control.

Figure 7:
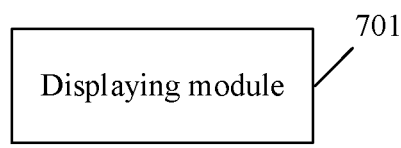
FIG. 7 is a schematic diagram of a communication apparatus according to another embodiment of the present disclosure.

Reference is made to FIG. 7, and a communication apparatus is provided according to an embodiment of the present disclosure to implement the methods shown in the above drawings. The apparatus embodiment corresponds to the method embodiment shown in FIG. 1. The apparatus may be applied to various electronic devices.

As shown in FIG. 7, the communication apparatus in the embodiment includes a displaying module 701. The displaying module 701 is configured to display, in response to a determination that a target call request is received and an ongoing call process exists, call prompt information corresponding to the target call request.

In the embodiment, for processing of the displaying module 701 of the communication apparatus and resulting technical effects, one may refer to related illustration of step 401 in the embodiment described with reference to FIG. 4. Details are not described herein.

In some embodiments, the call process includes: a multimedia conference process and a contact call process.

In some embodiments, the call prompt information includes rejection control and/or response control. The apparatus is configured to initiate, in response to detecting a triggering operation to response control, a call corresponding to the triggered response control.

In some embodiments, the apparatus is further configured to: terminate the ongoing call process in response to detecting the triggering operation to the response control.

Figure 8:
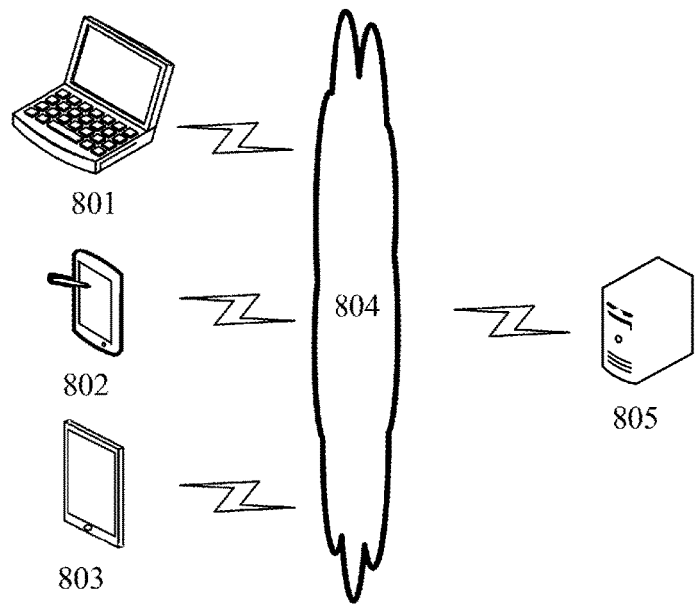
FIG. 8 shows an architecture of a schematic system to which the communication method according to the embodiment of the present disclosure is applied.

Reference is made to FIG. 8 which shows an architecture of a schematic system to which the communication method according to the embodiment may be applied.

As shown in FIG. 8, the system architecture may include terminal devices 801, 802 and 803, a network 804 and a server 805. The network 804 is configured to provide medium of a communication link between the terminal devices 801, 802, 803 and the server 805. The network 804 may include various types of connections, such as wired, wireless communication links or optical fiber cable.

The terminal devices 801, 802 and 803 may interact with the server 805 over the network 804, to receive or transmit messages. The terminal devices 801, 802 and 803 may be installed with various clients, such as webpage browser application, search application and news application. Clients of the terminal devices 801, 802 and 803 may receive a user instruction, and performs corresponding functions in response to the user instruction. For example, the clients add corresponding information in the information in response to the user instruction.

The terminal devices 801, 802 and 803 may be implemented by hardware or software. In a case that the terminal devices 801, 802 and 803 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 801, 802 and 803 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 805 may provide various services. For example, the server 805 is configured to receive an information acquisition request transmitted from the terminal devices 801, 802 and 803, acquire display information corresponding to the information acquisition request, and send data related to the display information to the terminal devices 801, 802 and 803.

It should be noted that, the communication method described in the embodiments of the present disclosure may be performed by the terminal device. Accordingly, the communication apparatus may be arranged in the terminal devices 801, 802 and 803. In addition, the communication method described in the embodiments of the present disclosure may be performed by the server 805. Accordingly, the communication apparatus may be arranged in the server 805.

It should be understood that the numbers of terminal device, network and server in FIG. 8 are only schematic. Any number of terminal device, network and server may be provided according to actual need.

Figure 9:
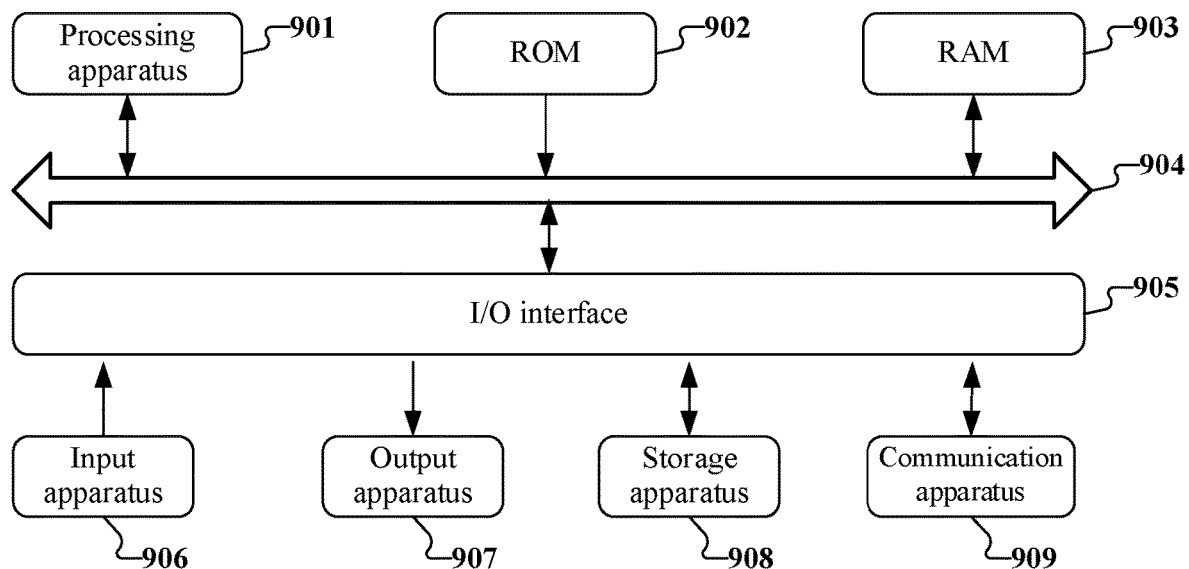
FIG. 9 is a schematic structural diagram of an electronic device according to an embodiment of the present disclosure.

Reference is made to FIG. 9 which shows a schematic structural diagram of an electronic device (for example a terminal device or a server shown in FIG. 8) for implementing the embodiment of the present disclosure. The terminal device in the embodiments of the present disclosure may include but not limited to: mobile terminals such as a mobile phone, a notebook computer, a digital broadcast receiver, a PDA (personal digital assistants), a PAD (tablet computer), a PMP (portable multimedia player), a vehicle-mounted terminal (for example a vehicle-mounted navigation terminal), and fixed terminals such as digital TV and a tablet computer. The electronic device shown in FIG. 9 is only schematic, and does not limit the functions and usage of the embodiments of the present disclosure.

As shown in FIG. 9, the electronic device may include a processing apparatus (such as a central processor and a graphic processor) 901. The processing apparatus may perform various appropriate actions and processing by executing programs stored in a read-only memory (ROM) 902 or programs uploaded from a storage apparatus 908 to a random access memory (RAM) 903. Various programs and data required for operations of the electronic device 900 are also stored in the RAM 903. The processing apparatus 901, the ROM 902 and the RAM 903 are connected to each other through the bus 904. An input/output (I/O) interface 905 is also connected to the bus 904.

Generally, the following components are connected to the I/O interface 905: an input apparatus 906 such as a touch screen, a touch panel, a keyboard, a mouse, a camera, a microphone, an accelerometer, and gyroscope; an output apparatus 907 such as a liquid crystal display (LCD), a loudspeaker and a vibrator; a storage apparatus 908 such as a magnetic tape and a hard disk; and a communication apparatus 909. The communication apparatus 909 may allow the electronic device to communicate with other device in a wired or wireless manner to exchange data. Although FIG. 9 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 909, installed from the storage apparatus 908 or installed from the ROM 902. The computer program is executed by the processing apparatus 901 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device.

The computer readable storage medium carries one or more programs. The one or more programs, when being executed by the electronic device, causes the electronic device to perform operations: determining, in response to a call initiation operation of a multimedia conference, a candidate object of the multimedia conference according to an object to which the call initiation operation is performed; and displaying call status information of the candidate object in a multimedia conference interface of the multimedia conference.

Alternatively, the computer readable medium carries one or more programs. The one or more programs, when being executed by the electronic device, cause the electronic device to perform an operation: displaying, in response to a determination that a target call request is received and an ongoing call process exists, call prompt information corresponding to the target call request.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the sending unit may be referred to as "a unit sending a request".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A communication method, comprising:
determining, in response to a call initiation operation of a multimedia conference, a candidate object of the multimedia conference according to an object to which the call initiation operation is performed;
displaying call status information of the candidate object in a multimedia conference interface of the multimedia conference, wherein the displaying call status information of the candidate object in a multimedia conference interface of the multimedia conference further comprises displaying the call status information in a conference participant list of the multimedia conference interface; and
stopping displaying the call status information for a candidate object who accepts a call in the conference participant list in response to a determination that the candidate object accepts the call.

2. The method according to claim 1, further comprising:
stopping displaying of the call status information for a candidate object which satisfies a preset condition in the conference participant list, in response to a determination that response information of the candidate object to a call request satisfies the preset condition.

3. The method according to claim 2, wherein the stopping displaying of the call status information for a candidate object satisfying a preset condition in the conference participant list, in response to a determination that response information of the candidate object to a call request satisfies the preset condition comprises:
stopping displaying of the call status information for a candidate object which rejects a call in the conference participant list, in response to a determination that the candidate object rejects the call.

4. The method according to claim 2, wherein the stopping displaying of the call status information for a candidate object satisfying a preset condition in the conference participant list, in response to a determination that response information of the candidate object to a call request satisfies the preset condition comprises:
stopping displaying of the call status information for a candidate object which performs no response in a predetermine time period in the conference participant list, in response to a determination that the candidate object performs no response in the predetermined time period.

5. The method according to claim 1, wherein the displaying call status information of the candidate object in a multimedia conference interface of the multimedia conference comprises:
determining, in response to a determination that a contact search operation is detected, whether an object indicated by the contact search operation is a candidate object of the multimedia conference; and
displaying the call status information in response to a determination that the object indicated by the contact search operation is the candidate object of the multimedia conference.

6. The method according to claim 5, further comprising:
initiating a call to the object indicated by the contact search operation, in response to a determination that the object indicated by the contact search operation is not the candidate object of the multimedia conference and a call initiation operation for the object indicated by the contact search operation is detected.

7. The method according to claim 1, further comprising:
sending a call initiation notification to a server in response to a determination that the call initiation operation is detected, wherein the call initiation notification comprises a candidate object identifier, and the server generates an update notification of the candidate object in response to receiving the candidate object identifier.

8. The method according to claim 1, wherein the determining, in response to a call initiation operation of a multimedia conference, a candidate object of the multimedia conference according to an object to which the call initiation operation is performed comprises:
determining, in response to receiving an update notification of the candidate object from a server, the candidate object of the multimedia conference according to a candidate object identifier in the update notification of the candidate object.

9. The method according to claim 1, wherein the candidate object displays, in response to a determination that a response status indicates a call request being received, call prompt information for the call request, wherein the call prompt information comprises rejection control and/or response control.

10. The method according to claim 9, wherein the candidate object terminates, in response to detecting triggering to the response control, calls except a call corresponding to the triggered response control.

11. The method according to claim 1, wherein the candidate object displays, in response to receiving at least two call requests, call prompt information for each of the at least two call requests, wherein the call prompt information comprises rejection control and/or response control.

12. The method according to claim 11, wherein the displaying, in response to receiving at least two call requests, call prompt information for each of the at least two call requests by the candidate object comprises:
displaying call prompt information of the at least two call requests in a same interface.

13. The method according to claim 11, wherein the displaying, in response to receiving at least two call requests, call prompt information for each of the at least two call requests by the candidate object comprises:

generating a call request queue according to time when the call request is received;

displaying, in response to a detection that a target call request in the call request queue is rejected, call prompt information for a call request after the target call request in the call request queue.

14. A call processing method, comprising:

displaying, in response to a determination that a target call request is received and an ongoing call process exists, call prompt information corresponding to the target call request;

initiating a call for a multimedia conference in response to detecting a triggering operation associated with the call prompt information;

displaying call status information of a candidate object in a multimedia conference interface of the multimedia conference, wherein the displaying call status information of the candidate object in a multimedia conference interface of the multimedia conference further comprises displaying the call status information in a conference participant list of the multimedia conference interface; and stopping displaying the call status information for the candidate object in the conference participant list in response to a determination that the candidate object accepts the call.

15. The method according to claim 14, wherein the call process comprises: a multimedia conference process and/or a contact call process.

16. The method according to claim 14, wherein the call prompt information comprises rejection control and/or response control.

17. The method according to claim 14, further comprising:

terminating the ongoing call process in response to detecting the triggering operation to the response control.

18. The method according to claim 14, wherein the call prompt information comprises at least one of: a conference identifier, a calling party information and a call type.

19. A communication apparatus, comprising:

at least one processor; and at least one memory communicatively coupled to the at least one processor and storing instructions that upon execution by the at least one processor cause the apparatus to:

determine, in response to a call initiation operation of a multimedia conference, a candidate object of the multimedia conference according to an object to which the call initiation operation is performed;

display call status information of the candidate object in a multimedia conference interface of the multimedia conference, wherein the displaying call status information of the candidate object in a multimedia conference interface of the multimedia conference further comprises displaying the call status information in a conference participant list of the multimedia conference interface; and stopping displaying the call status information for a candidate object who accepts a call in the conference participant list in response to a determination that the candidate object accepts the call.

20. A communication apparatus, comprising:

at least one processor; and at least one memory communicatively coupled to the at least one processor and storing instructions that upon execution by the at least one processor cause the apparatus to: perform the method according to claim 14.

21. A computer readable non-transitory medium storing computer programs, wherein the computer programs are executed by a processor to perform the method according to claim 1.

22. A computer readable non-transitory medium storing computer programs, wherein the computer programs are executed by a processor to perform the method according to claim 14.

* * * * *